United States Patent
Zechner et al.

(10) Patent No.: US 12,066,568 B2
(45) Date of Patent: Aug. 20, 2024

(54) DEVICE AND METHOD FOR CALIBRATING A MULTIPLE-INPUT MULTIPLE OUTPUT RADAR SENSOR

(71) Applicant: ZF Friedrichshafen AG, Friedrichshafen (DE)

(72) Inventors: Stefan Zechner, Weißensberg (DE); Benjamin Sick, Bodolz (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 511 days.

(21) Appl. No.: 17/423,828

(22) PCT Filed: Jan. 10, 2020

(86) PCT No.: PCT/EP2020/050516
§ 371 (c)(1),
(2) Date: Jul. 16, 2021

(87) PCT Pub. No.: WO2020/148179
PCT Pub. Date: Jul. 23, 2020

(65) Prior Publication Data
US 2022/0113376 A1 Apr. 14, 2022

(30) Foreign Application Priority Data

Jan. 18, 2019 (DE) ...................... 10 2019 200 612.4

(51) Int. Cl.
*G01S 7/40* (2006.01)
*G01S 13/42* (2006.01)
*G01S 13/931* (2020.01)

(52) U.S. Cl.
CPC ............ *G01S 7/4026* (2013.01); *G01S 7/403* (2021.05); *G01S 7/4034* (2021.05);
(Continued)

(58) Field of Classification Search
CPC ...... G01S 7/4026; G01S 7/4034; G01S 7/403; G01S 13/426; G01S 13/931
See application file for complete search history.

(56) References Cited

U.S. PATENT DOCUMENTS

2002/0072869 A1\* 6/2002 Stiller .................... G01S 17/931
702/90
2004/0042439 A1\* 3/2004 Menon ................ H04L 25/0248
370/208
(Continued)

FOREIGN PATENT DOCUMENTS

DE     10 2014 208 899 A1    11/2015
DE     10 2019 200 612.4     7/2020
(Continued)

OTHER PUBLICATIONS

Office Action and English Translation in Corresponding Japanese Application No. 2021-541540, dated Sep. 19, 2023 (5 pages).
(Continued)

*Primary Examiner* — Bernarr E Gregory
*Assistant Examiner* — Hailey R Le
(74) *Attorney, Agent, or Firm* — Crowell & Moring LLP

(57) ABSTRACT

A device includes an input interface for receiving a target list for the MIMO radar sensor containing angular data including information regarding a target angle, at which the target is located, and channel data including information regarding reflection signals received from the target in individual channels in the MIMO radar sensor; a modeling unit for generating model data for each of the targets; a processor for determining a model error for each of the targets, containing information regarding a discrepancy between the channel data and the model data for the target; a selector for selecting one of the targets on the basis of the model error; and an adjustment unit for determining calibration coefficients for (Continued)

adjusting the channel outputs in the MIMO radar that compensate for the discrepancies between the channel data and the model data.

20 Claims, 3 Drawing Sheets

(52) U.S. Cl.
CPC .......... *G01S 13/426* (2013.01); *G01S 13/931* (2013.01); *G01S 2013/93271* (2020.01)

(56) References Cited

U.S. PATENT DOCUMENTS

| | | | | |
|---|---|---|---|---|
| 2005/0174981 | A1* | 8/2005 | Heath, Jr. | H04W 72/23 |
| | | | | 370/342 |
| 2016/0277132 | A1* | 9/2016 | Pratt | H04B 7/10 |
| 2017/0045609 | A1* | 2/2017 | Loesch | H01Q 1/3233 |
| 2017/0186178 | A1* | 6/2017 | Nagasaka | H04B 10/116 |
| 2017/0307728 | A1* | 10/2017 | Eshraghi | G01S 7/282 |
| 2018/0113216 | A1* | 4/2018 | Kremer | G01S 17/42 |
| 2018/0115348 | A1* | 4/2018 | Li | H01M 4/362 |
| 2018/0151958 | A1 | 5/2018 | Lim et al. | |
| 2020/0092017 | A1* | 3/2020 | Song | H04B 17/30 |
| 2021/0025972 | A1* | 1/2021 | Loesch | H04B 17/21 |

FOREIGN PATENT DOCUMENTS

| | | |
|---|---|---|
| JP | 2001227982 A | 8/2001 |
| JP | 2017513027 A | 5/2017 |
| JP | 2017211241 A | 11/2017 |
| JP | 2019178922 A | 10/2019 |
| WO | WO 2020/148179 A1 | 7/2020 |

OTHER PUBLICATIONS

International Search Report and Written Opinion issued in PCT/EP2020/050516 completed on Mar. 17, 2020 and mailed on Mar. 17, 2020 and mailed on Mar. 31, 2020(10 pages).

German Search Report issued in DE 10 2019 200 612.4 on Dec. 8, 2020 (8 pages).

* cited by examiner

DEVICE AND METHOD FOR CALIBRATING A MULTIPLE-INPUT MULTIPLE OUTPUT RADAR SENSOR

CROSS-REFERENCE TO RELATED APPLICATIONS

This application is a U.S. national stage application under 35 U.S.C. § 371 of PCT Application No. PCT/EP2020/050516, filed on Jan. 10, 2020, and published as WO 2020/148179 A1 on Jul. 23, 2020, which claims priority from German Application No. DE 10 2019 200 612.4, filed on Jan. 18, 2019, the entirety of which are each hereby fully incorporated by reference herein.

The present invention relates to a device for calibrating a multiple-input multiple-output (MIMO) radar sensors, and a corresponding method, and a system with an MIMO radar sensor and a device.

Modern vehicles (automobiles, vans, trucks, motorcycles, etc.) comprise numerous sensors that provide the driver with information, and partially or fully automatically control individual vehicle functions. An important prerequisite is the acquisition, detection, and modelling of the environment of the individual vehicle. Sensor data containing information regarding the environment are acquired with environment sensors, e.g. radar, lidar, ultrasonic, and camera sensors. Based on these data, as well as taking any other available data in the vehicle into account, objects in the vehicle's environment can be identified and classified. Based on this, a behavior of an autonomous or partially autonomous vehicle can be adapted to a current situation, or supplementary information can be made available to the driver.

One widespread sensor principle is radar technology. Radar sensors for vehicles normally comprise numerous transmission and reception elements, and function as multiple-input multiple-output radars (MIMO radars). The transmission and reception elements form virtual channels for the radar sensors (Rx/Tx antenna pairs), in which each channel represents a different position. A target can be detected (azimuth and altitude angular position, doppler or relative speed) by evaluating the phases and amplitudes of the radar signals at the various channels (channel responses).

There are differences and discrepancies that arise in the production and processing of radar sensors. To improve the quality of the signal it is therefore a common practice to calibrate each individual radar sensor in order to obtain a calibration of the channel responses. This calibration often first takes place when the radar sensor is already installed in the vehicle. A target is typically created for this in a measurement chamber at the azimuth and altitude points of origin, and the channel response is measured. This is composed of n complex values for the n available channels that are extracted for the target at a position known from the range/doppler graph. A target at the points of origin ideally generates the same response in all channels with regard to the amplitude and phase. The measurement values that are obtained therefore directly indicate the discrepancy for the sensor that is being calibrated, and can be used for the calibration. (Complex) calibration coefficients are obtained for the channels using this approach. These calibration coefficients are subsequently used in that the range/doppler graph is divided by them after the calculation.

One of the challenges that must be overcome is that the behavior of a radar sensor may change over the course of its service life. The effects of factors such as temperature fluctuations, moisture, vibrations, etc. can result in a greater load and degradation in the radar sensor, in particular in the automotive industry. An initial calibration may become extremely inaccurate over time, resulting in limited precision. Changes within the radar sensor may occur over long periods of time, e.g. many years, or quickly, e.g. within minutes. This frequently requires a (complicated) recalibration or an (expensive) replacement of the radar sensor.

Based on this, the object of the invention is to improve the reliability and precision of a radar sensor. In particular, the complexity and expenses for recalibration are to be reduced. This is intended to increase the durability of the radar sensor.

To achieve this object, a first aspect of the invention relates to a device for calibrating an MIMO radar sensor, which comprises:

- an input interface for receiving a target list for the MIMO radar sensor containing angular data and channel data for numerous targets in a vehicle's environment, in which the angular data contain information regarding a target angle at which a target is located, and the channel data comprise information regarding reflection signals that have been received from the target in individual channels in the MIMO radar sensor;
- a modeling unit that generates model data for each target, containing information regarding expected reflection signals for detecting an individual target at the target angle, at a distance to the MIMO radar sensor, on the basis of the angular data;
- a processor for determining an error in a model for each target, containing information regarding discrepancies between the channel data and the model data for the target;
- a selector for selecting a target on the basis of the model error, in which the model error for the selected target is smaller than the model errors for other targets; and
- an adjustment unit for obtaining calibration coefficients containing information regarding an adjustment of channel outputs for the channels in the MIMO radar sensor on the basis of the model data and the channel data, in which the calibration coefficients compensate for the discrepancies between the channel data and the model data.

Another aspect of the present invention relates to a system containing a MIMO radar sensor and the device described above.

Further aspects of the invention relate to a method designed in accordance with the device, and a computer program containing program code for executing the steps of the method when the program code is executed on a computer, and a storage medium on which the computer program is stored that executes the method described herein when executed on a computer.

Preferred embodiments of the invention are described in the dependent claims. It should be noted that the features specified above and explained below can be used not only in the combinations given herein, but also in other combinations, or in and of themselves, without abandoning the framework of the present invention. In particular, the device, system, method and computer program can be designed in accordance with the embodiments of the device and the system described in the dependent claims.

According to the invention, the sensor data for an MIMO radar sensor are received. The target list that is received comprises the azimuth and altitude angle of a target in a vehicle's environment (angular data) and the channel responses from the various channels in the MIMO radar sensor (channel data). The sensor data are preferably received after a pre-processing by the radar sensor. A model of an assumed individual target (individual target model) is first generated on the basis of these data, which has been detected at the target angle for the actual target at a distance to the radar sensor. A model is therefore generated that comprises model data corresponding to the channel data. In other words, ideal channel responses simulated as model data are generated for an assumed target at the (actual) target angle. A model error is calculated for this assumed individual target. This model error represents a discrepancy between the actual target, or the actual data (channel data) and the simulated individual target, or the ideal data (model data). In the next step, at least one target is selected on the basis of the model error. In particular, a target is selected that has lower model errors than the other targets. With this target, it is assumed that the actual target is actually an individual target. This means that the discrepancies between channel data and model data indicate an imprecise calibration. Calibration coefficients are obtained to adjust the outputs of the channels for future measurements, such that these discrepancies are compensated for. In other words, the radar sensor is calibrated such that the channel responses, or the channel outputs for the channels in the MIMO radar sensor are modified such that the actual data better correspond to the model for a selected target.

The device according to the invention enables a calibration of a radar sensor while the radar sensor is in operation. In particular, a continuous calibration is made possible, and a continuous updating of the calibration takes place. The calibration coefficients for the channels are adjusted after each measurement. The channel data obtained in the subsequent time period are then determined or pre-processed on the basis of the new calibration coefficients. Changes in the sensor can be detected and directly compensated for as a result. The calibration coefficients correspond to the initial calibration coefficients determined in production, and are preferably used in addition thereto on the channel outputs. This results in an additional calibration, in the manner of a fine adjustment of the channels. Both short-term and long-term effects can be compensated for. This results in improved detection and a more precise plotting of the azimuth and altitude angles to a target. A greater precision is obtained.

In a preferred embodiment, the modeling unit is designed to determine a scaling vector with mean scaling factors for the individual channels in the MIMO radar sensor on the basis of the channel data. The modeling unit is also designed to determine a steering matrix on the basis of the arrangement of the channels in the MIMO radar sensor and the angular data. The modeling unit is also designed to generate the model data on the basis of a multiplication of the steering matrix with the scaling vector. A mean phase and amplitude are first estimated, in particular, on the basis of the channel data, and a corresponding scaling vector is determined. A steering matrix (which can also be referred to as a steering vector) is then calculated, which reflects the arrangement of the (virtual) channels as well as the angle at which a target has been detected. The steering matrix is multiplied with the scaling vector to obtain the model data. An accurate mapping of the sensor topology and the current measurement values is then generated. This also results in an efficiently computable approach, which can be carried out at a high refresh rate, even with limited computing power.

In a preferred embodiment, the processor is configured to determine a mean squared error via the channels in the MIMO radar sensor. The model error is calculated as the mean squared error. An error is determined and squared for each channel. The square root of the mean value then corresponds to the squared mean value. This squared mean value serves as a measure for the discrepancies between the channel data and the model data for the target. This results in an efficiently computable possibility for determining the model error. A simple assessment of the discrepancies between the model and reality is thus obtained.

In an advantageous embodiment, the selector is designed to select a target with a mean squared error lying below a threshold value. The threshold value is preferably defined in advance. A comparison with a threshold value represents an efficient evaluation means. Only those targets that have a mean squared error lying below a threshold value are taken under further consideration. This results in a simple computability.

In one advantageous embodiment, the selector is designed to select a target based on a signal-to-noise ratio for the reflection signals that are received. A target is preferably formed that has a signal-to-noise ratio lying above a threshold value. A signal-to-noise ratio can also be taken into account when selecting the targets. Only strong signals, or relatively strong signals, are then incorporated in the further processing. This improves the precision of the method, because the detection of stronger targets, i.e. targets with a high signal-to-noise ratio, is improved, or more precise.

In one advantageous embodiment, the adjustment unit is designed to determine the calibration coefficients on the basis of a sliding mean value. By using a sliding mean value, a smoothing is obtained over time. Changes in the channel responses of the radar sensor are reacted to continuously, in small increments. Errors or inaccurate calibration due to by singularities are avoided using a sliding mean value.

In an advantageous embodiment, the device contains a displacement compensation unit for determining an angular displacement on the basis of the calibration coefficients and for calculating and applying a compensation factor to the calibration coefficients, if the angular displacement lies above a threshold value. The threshold value is again preferably predefined. The displacement compensation unit is thus configured to compensate for a drift that may result with the use of the calibration coefficients. A method according to the invention may result in a displacement of the point of origin for the radar sensor over time. If such a displacement has been detected, it is then compensated for. The system is then returned to the originally set point of origin. This has the advantage of ensuring long-term precision.

The displacement compensation unit is preferably designed to execute a beam formation for a point of origin and for points neighboring the point of origin on the basis of the calibration coefficients. All of the points neighboring the point of origin preferably display the same angular distance to the point of origin. The displacement compensation unit is also designed to calculate and apply the compensation factor if the value for the response of the beam formation at a point neighboring the point of origin is greater than the value for the response of the beam formation at the point of origin. A direct neighborhood can be defined, e.g., by a 0.02° azimuth and/or altitude distance. If it has been determined that a beam formation at one of these points in the neighborhood of the point of origin delivers a response with a higher value than the point of origin itself, an adjustment is made. In particular, the values for the direction that is determined to have the channel response with the highest value can be used as the basis for calculating a quotient to be applied to the calibration coefficients. This ensures that precision is maintained over the long term. This also prevents discrepancies in the form of a bias.

In another advantageous embodiment, the displacement compensation unit is designed to calculate the compensation factor on the basis of one half of an angle between the point of origin and the point in the neighborhood of the point of origin with the response of the beam formation that has the highest value. A point halfway between the point of origin and the point determined to have the response with the highest value can preferably be used as the basis for readjustment or fine-calibration. This results in long-term precision.

In another advantageous embodiment, the adjustment unit is designed to determine the calibration coefficients for a previous time interval, if it has been determined on the basis of the target list that the vehicle is not in motion. Always using the same target can result in errors. It is therefore possible to temporarily deactivate the fine calibration according to the invention if a stationary vehicle constantly detects the same target over a long period of time. This ensures that an error does not continue to propagate when determining the calibration coefficients. A long-term precision and proper calibration are ensured in this manner.

In another advantageous embodiment, the modeling unit is designed to generate model data on the basis of how the individual channels affect one another. A clear relationship between a channel response and a single calibration coefficient does not need to be used for the modeling, and instead, a general model is created. In particular, the effects of adjacent channels on one another can be taken into account. This results in greater precision when generating model data (modeling).

In an advantageous embodiment of the system, the MIMO radar sensor is configured to transmit and receive radar signals in a frequency range of 70 GHz to 80 GHz, preferably at 77 GHz. These frequencies have proven to be particularly advantageous for use in the automotive industry.

A radar sensor emits a radar signal and receives reflections of the radar signal on objects within a field of vision of the radar sensor. The field of vision represents the region within which the object can be detected. A vehicle's environment comprises in particular a visible region in the vehicle's environment for a radar sensor attached to a vehicle. A radar sensor can also comprise numerous individual sensors, which enable a 360° view, and are thus able to plot a complete image of the vehicle's environment. The sensor data from a radar signal comprise, in particular, a distance, point velocity, corresponding to a micro-doppler datum, an altitude angle, and an azimuth angle for various detections by the radar sensor. A scanning point is understood to be a single point, i.e. a single detection, comprising the above information. Numerous scanning points are normally generated during a measurement cycle by the radar sensor. A measurement cycle is a single scanning of the visible region. The canning points recorded in a measurement cycle can be referred to as the target list (radar target list). The values and coefficients specified herein can each be vectors that comprise numerous values. These coefficients and values can be complex values.

The invention shall be described and explained in greater detail below on the basis of selected exemplary embodiments in conjunction with the attached drawings. Therein:

Figure 1:
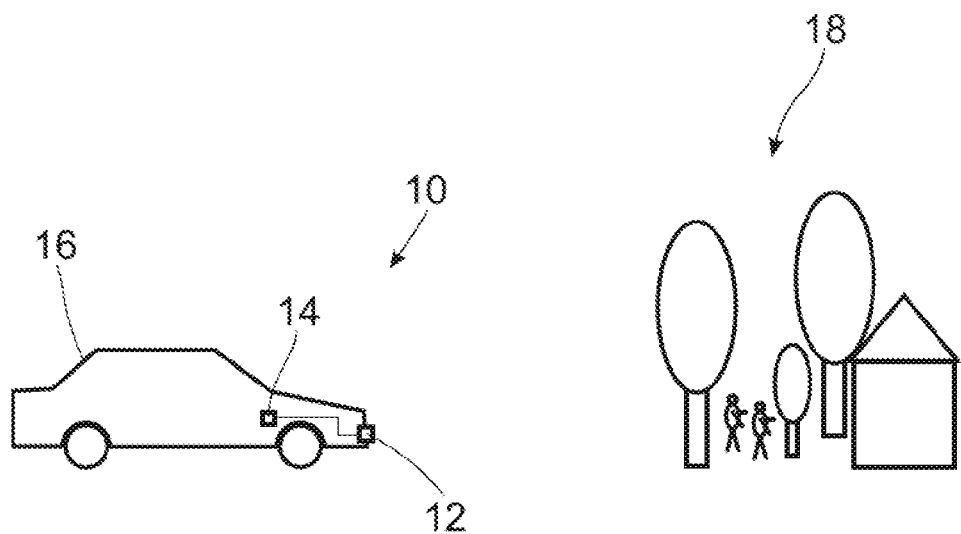
FIG. 1 shows a schematic illustration of a system according to the invention in a vehicle in an environment.

A schematic illustration of a system 10 according to the invention that has an MIMO-radar sensor 12 and a device 14 for calibrating the MIMO radar sensor 12 is shown in FIG. 1. The system 10 is integrated in a vehicle 16 in this exemplary embodiment. Objects 18 in the vehicle's 16 environment are detected with the MIMO radar sensor. The MIMO radar sensor 12 also comprises numerous transmitters and numerous receivers. The transmitters emit radar signals into the vehicle's 16 environment. Reflections of the radar signals on objects 18 in the vehicle's environment are received by the receivers. The combined transmitters and receivers form a number of virtual receiver channels, wherein each receiver channel corresponds to one transmitter and one receiver. A channel response comprising an amplitude and a phase is received for each channel.

When this MIMO radar sensor 12 is first placed in operation, the individual channels are normally calibrated in order to obtain precise measurements. A radar target (e.g. a corner reflector) in an absorber space is usually used for this. If the target is located at the point of origin, the same channel response should be generated at all channels. This calibration becomes worse over time when the vehicle is in operation, such that it becomes necessary to recalibrate. A device is proposed here in accordance with the invention, for calibrating the MIMO radar sensor, which enables continuous (inline) calibration on the basis of current measurement data.

Figure 2:
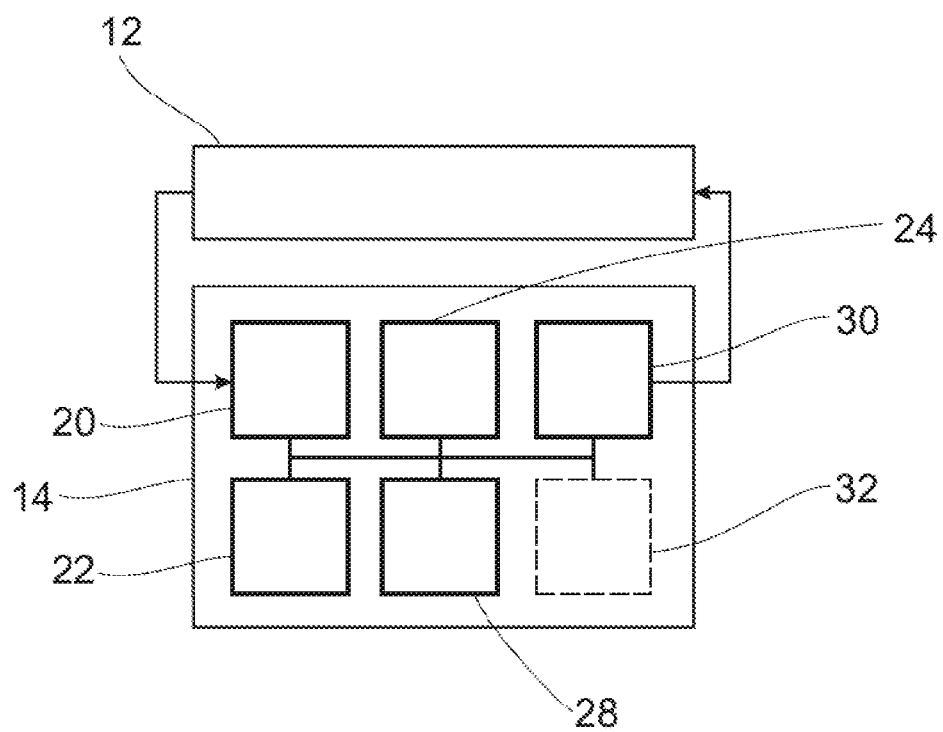
FIG. 2 shows a schematic illustration of a device according to the invention.

A device 14 according to the invention is shown in a schematic illustration in FIG. 2. The device 14 can be integrated, e.g., in a control unit for a vehicle. The device 14 can also be integrated in the MIMO radar sensor 12. The device 14 can also be in the form of software in a processor in the vehicle control unit or a radar sensor.

The device 14 comprises an input interface 20 via which a target list for the MIMO radar sensor is received. The target list is a radar target list, comprising at least angular data, in particular altitude and azimuth angles, as well as channel data corresponding to the individual channel responses of the virtual channels in the MIMO radar sensor 12 for numerous targets. The input interface 20 can be attached to a vehicle bus system, by way of example.

The device 14 according to the invention also comprises a modeling unit 22, in which an individual target model is created, or model data are generated, for each target in the target list. Channel responses are calculated for the model data that are to be expected with an optimal calibration for the detection of an individual target at a distance to the radar sensor (e.g. 20 meters) at the actual angle. The angular data (azimuth and altitude) for the detected target are used to generate the model data to determine an expected channel response for an individual target (individual target model).

The device 14 also comprises a processor 24. A model error is determined in the processor 24. A discrepancy between the actual data, i.e. the channel data, and the previously generated model data, i.e. the modeled data for an assumed individual target, is then calculated. An error metric is preferably determined for this on the basis of the mean squared error (MSE) between the measured signal and the individual target model. The ratio of the MSE to the signal strength represents a measure for the discrepancy between the signal and an ideal individual target with the same signal strength.

In deriving the MSE, it is assumed herein that a vector x is obtained for the signal-channel responses for a target:

$x = A_{nm}(\delta)s + \sigma$

Where $A_{nm}$ is the steering matrix obtained from the spatial angle δ. The dimension n corresponds to the number of channels, and m corresponds to the number of (point) targets that contribute to the signal. The unknown vector s of complex scaling factors (scaling vectors) has a length of m. The individual scaling factors correspond to the amplitude and phase shift of the m point targets. There is also a noise component σ. The model errors (individual target errors) used for the calibration and the corresponding models (individual target models) are derived from the equation for m=1.

The scaling vector s can be estimated as the mean scaling ŝ from the measured signal:

$$\hat{s} = A^+ x$$

$A^+$ indicates the pseudoinverse of the steering matrix A. Based on this, a model signal is obtained for the individual target (model data) when scaling to the input signal (channel data):

$$x' = A\hat{s} = AA^+ x$$

The model error can then be calculated as the mean squared error between the channel data and the model data:

$$MSE = \|x - x'\|_2 = \|x - AA^+ x\|_2.$$

Figure 3A:
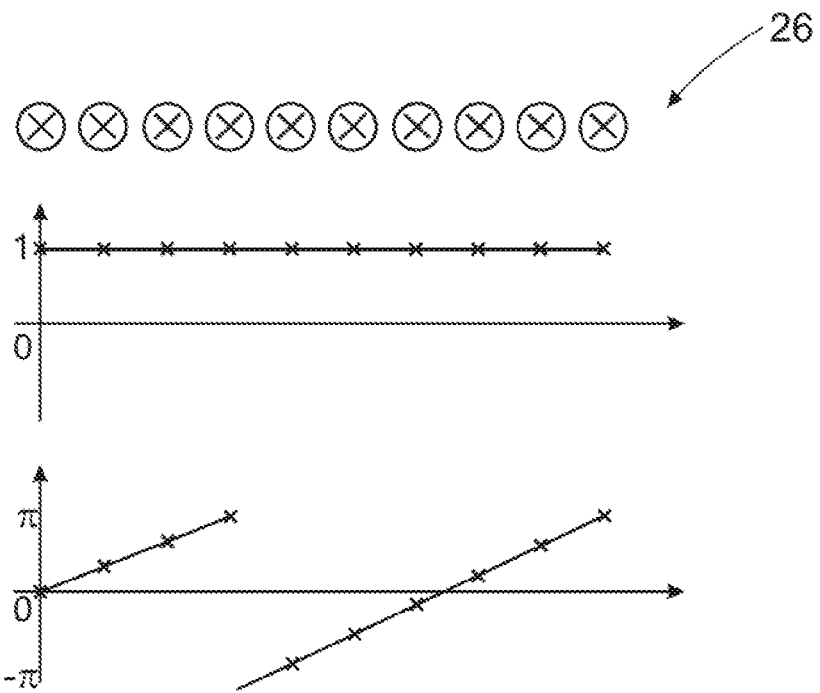
FIGS. 3a, 3b show a schematic illustration of data processing according to the invention.
Figure 3B:
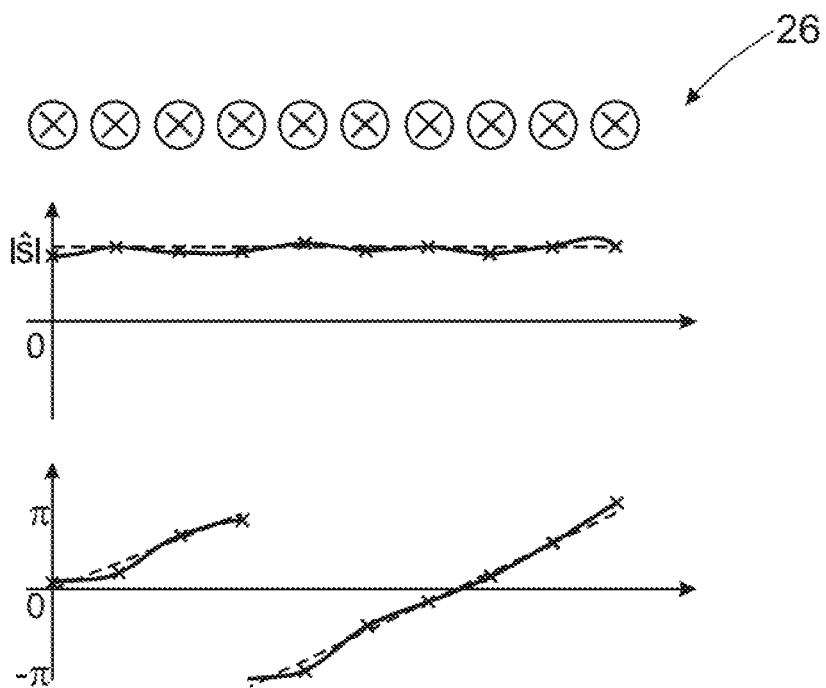

The approach is illustrated schematically in FIGS. 3a and 3b. In an ideal case for the target that has been detected at an angle, the combined amplitude (upper diagram) and phase (lower diagram) are obtained for an assumed linear antenna arrangement 26. The amplitude is assumed to have a value of 1. It is assumed that the phase begins at zero. The illustration corresponds to a steering matrix for an individual target that has been detected at a spatial angle δ. An approach for the modeling is illustrated in FIG. 3a in this regard.

The solid lines in FIG. 3b schematically illustrate, by way of example, actual measurement values or channel data. To determine the model error for the target, the estimated complex scaling vector, with a value of ŝ, is then first used on the steering vector (cf. FIG. 3a). The amplitude and phase differences correspond to the model error for this target. The broken lines then correspond to the model or model data.

Returning to FIG. 2, the device 14 also comprises a selector 28. At least one target is selected in the selector 28 on the basis of the model error previously determined for the numerous targets. In particular, a target is selected that has only a small model error. In other words, only those detections that differ slightly from the individual target model are considered. It is assumed for these targets that they are actually real, individual, or isolated targets in all radar dimensions.

Supplementary criteria, such as a high signal-to-noise ratio and/or a high signal power, can also be taken into consideration when the target is selected by the selector 28, to further limit the selection of the appropriate targets for the calibration, and thus obtain a more efficient calibration.

Calibration coefficients are then determined in an adjustment unit 30 in the device 14, in order to be able to calibrate the channel outputs for the channels in the MIMO radar sensor on the basis thereof. Assuming that the selected target is actually an individual or isolated target in all radar dimensions, a ratio between the complex signal (channel data) and the individual target model (model data) is determined and it is assumed that this ratio corresponds to a calibration error for the target in question. In other words, a calibration error is determined that can then be compensated for via calibration coefficients.

Because the assumptions made for an individual target can only be satisfied to a certain extent (actual targets can only represent an ideal individual target in exceptional cases, because of their size, for example), the adjustment unit 30 is preferably configured to make a long-term observation. For this, a number of different targets are observed. The fine-calibration estimation, or determination of calibration coefficients is obtained using a sliding mean value filter for each channel. The errors determined in this time interval for each cycle of the signal processing are only taken in part into consideration in the determination of the calibration coefficients. An improvement can be obtained in the signal processing in the MIMO radar sensor through the use of the calibration coefficients in conjunction with the compensation on the basis of the calibration carried out in production. After a settling period, there is a significant increase in the quality of the radar signal with regard to the angular dimensions.

The device according to the invention optionally comprises a displacement compensation device 32. The separate filtering for the individual channels can result in an error in the signal processing in the determination of the angle for a target. The point of origin for the angle set during production, or in the initial calibration, may be displaced as a result. To prevent this error, it is advantageous that the calibration effects resulting from the use of the calibration coefficients on the channel outputs for the channels in the MIMO radar sensor are continuously monitored. If an angular displacement is obtained in all of the channels, this can then be compensated for. A compensation factor is preferably calculated for this and used if the angular displacement exceeds a threshold value.

Figure 4:
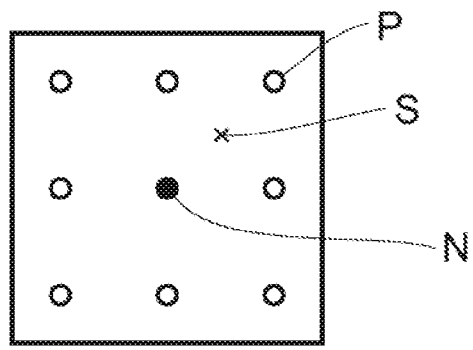
FIG. 4 shows a schematic illustration of displacement compensation according to the invention.

An approach for calculating the compensation factor is shown in FIG. 4. The azimuth is plotted on the horizontal axis. The altitude is plotted on the vertical axis. A beam formation for a point of origin N at zero degrees on the azimuth and zero degrees on the altitude is carried out with the values for the complex fine-calibration (calibration coefficients). A beam formation for point P in the immediate neighborhood of the point of origin N is also carried out. By way of example, an immediate neighborhood can be defined as a ±0.02°. The neighborhood of the point of origin N in the illustration therefore comprises nine points P. The values for the responses of the beam formations are determined for the point of origin and points P. If the response at zero degrees is greatest, then no relevant angular displacement has occurred. If it is determined that the value for the response of the beam formation ends at an angular combination outside the point of origin N, i.e. is greater for a point P in the neighborhood of the point of origin N, a compensation factor is determined. In particular, the corresponding steering vector (steering matrix) can be divided in a complex manner with half of the angle toward the point P that has the maximum value for the response of the beam formation. In the example shown here, this results in the point S indicated by an x between the point of origin N and point P in the neighborhood of the point of origin N. A continuous angular drift can be continuously actively compensated for using the compensation factor that has been determined.

The adjustment unit 30 can be configured to re-output the calibration coefficients determined in the previous time interval, if the same target is constantly detected over a longer period of time while the vehicle is stationary. In other words, the fine calibration is temporarily deactivated, and no new calibration coefficients are calculated. This increases reliability, because multiple observations of the same target may result in a displacement, or bias.

It is also possible to estimate the antenna position. If the calibration error is only compensated for via a complex factor, the discrepancies in the supply lines can be compensated for with a corresponding amplitude and phase (damping and length). It is also possible to directly estimate a displacement of the virtual antenna array. By way of example, the intersection of the incident individual target wavefront with the antenna plane can be regarded as a variation. A remaining fine-calibration error can then be compensated for by a displacement perpendicular to the intersection. It should be noted here that these approaches require targets in different directions in order to implement a compensation in the antenna structure in all directions.

It is also possible to incorporate an estimation of the effects of adjacent supply lines. Instead of creating a clear relationship between the respective channel response and a calibration coefficient, the channels can be modeled in general. In particular, the effect of one channel on an adjacent channel (supply line) can be taken into consideration in the modeling. This requires numerous measurements to solve an equation containing numerous unknown (complex) scaling factors between the channels. As a rule, the previously described approach remains unchanged.

Figure 5:
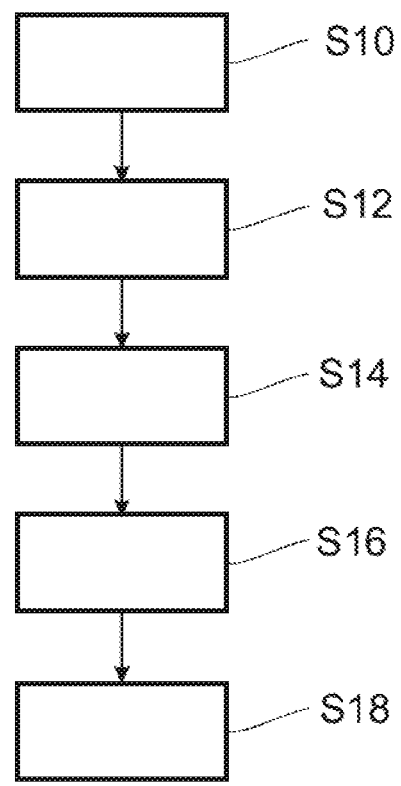
FIG. 5 shows a schematic illustration of a method according to the invention.

A method according to the invention is schematically illustrated in FIG. 5. The method comprises the following steps: receiving S10 a target list, generating S12 model data, determining S14 a model error, selecting S16 a target, and determining S18 calibration coefficients. The method can be implemented in the form of software that is executed on a processor for the radar sensor or on a vehicle control device. The method according to the invention is preferably used in the normal operation of a radar sensor. It is thus constantly checked whether the current driving situation is suitable for a fine calibration.

The invention has been comprehensively described and explained in the description in reference to the drawings. The description and explanation are to be understood as exemplary, and not limiting. The invention is not limited to the disclosed embodiments. Other embodiments or variations can be obtained by the person skilled in the art with the use of the present invention, and with a precise analysis of the drawings, the discloser, and the following claims.

The terms "comprise" and "containing" do not exclude the existence of other elements or steps. The indefinite article "an" or "one" does not exclude the existence of a plurality. A single element or an individual unit can execute the functions of numerous units specified in the claims. An element, a unit, an interface, a device, and a system can be implemented in part or in its entirety in hardware and/or software. Merely specifying some measures in numerous different dependent claims is not to be understood to mean that a combination of these measures cannot also be used advantageously. A computer program can be stored/distributed on a non-volatile data carrier, e.g. an optical memory or a solid state drive (SSD). A computer program can be distributed with hardware and/or as part of a hardware, e.g. by means of the internet or hard-wired or wireless communication systems. Reference symbols in the claims are not to be understood as limiting.

REFERENCE SYMBOLS 10 system
12 MIMO radar sensor
14 device
16 vehicle
18 object
20 input interface
22 modeling unit
24 processor
26 antenna assembly
28 selector
30 adjustment unit
32 displacement compensation unit

The invention claimed is:

1. A device for calibrating a multiple-input multiple-output (MIMO) radar sensor, comprising:
   an input interface configured to receive a target list for the MIMO radar sensor, containing angular data and channel data for a plurality of targets in a vehicle's environment, wherein the angular data comprise information regarding a target angle at which the target is located, and the channel data comprise information regarding reflection signals received from the target in individual channels in the MIMO radar sensor;
   a modeling unit configured to generate model data for each of the plurality of targets, containing information regarding expected reflection signals for an assumed detection of an individual target at a target angle, at a distance to the MIMO radar sensor, on a basis of the angular data;
   a processor configured to determine a model error for each of the plurality of targets, containing information regarding a discrepancy between the channel data and the model data for each target;
   a selector configured to select one of the plurality of targets on a basis of the model error that has been determined, wherein the model error for the selected target is smaller than the model errors of the other targets; and
   an adjustment unit configured to determine calibration coefficients containing information for adjusting the channel outputs in the MIMO radar sensor, on a basis of the model data and the channel data, wherein the calibration coefficients compensate for the discrepancies between the channel data and the model data.

2. The device according to claim 1, wherein the modeling unit is configured to:
   determine a scaling vector containing mean scaling factors for the individual channels in the MIMO radar sensor on the basis of the channel data;
   determine a steering matrix on a basis of the arrangement of the channels in the MIMO radar sensor, and the angular data; and
   generate the model data on a basis of a multiplication of the steering matrix with the scaling vector.

3. The device according to claim 1, wherein the processor is configured to determine a mean squared error via the channels in the MIMO radar sensor.

4. The device according to claim 3, wherein the selector is configured to select a target with a mean squared error that lies below a threshold value, and wherein the threshold value is predefined.

5. The device according to claim 1, wherein the selector is configured to select a target on a basis of a signal-to-noise ratio for the received reflection signal, wherein a target is selected that has a signal-to-noise ratio lying above a threshold value.

6. The device according to claim 1, wherein the adjustment unit is configured to determine a calibration coefficient on a basis of a sliding mean value.

7. The device according to claim 1, further comprising a displacement compensation unit configured to:

determine an angular displacement on a basis of the calibration coefficients; and calculate and use a compensation factor on the calibration coefficients, when the angular displacement lies above a threshold value, wherein the threshold value is predefined.

8. The device according to claim 7, wherein the displacement compensation unit is configured to:

execute a beam formation for a point of origin and for points in the neighborhood of the point of origin, on the basis of the calibration coefficients, wherein all of the points in the neighborhood of the point of origin are at the same angular distance to the point of origin; and calculate and use the compensation factor when the value for the response of the beam formation is greater for a point in the neighborhood of the point of origin than the value for the response of the beam formation for the point of origin.

9. The device according to claim 8, wherein the displacement compensation unit is configured to calculate the compensation factor on a basis of one half of an angle between the point of origin and the point in the neighborhood of the point of origin that has the response of the beam formation with the highest value.

10. The device according to claim 1, wherein the adjustment unit is configured to determine calibration coefficients for a previous time interval when it has been determined on a basis of the target list that the vehicle is not in motion.

11. The device according to claim 1, wherein the modeling unit is configured to generate the model data on a basis of effects of the individual channels on one another.

12. A system comprising:
the MIMO radar sensor; and
the device according to claim 1.

13. The system according to claim 12, wherein the MIMO radar sensor is configured to transmit and receive radar signals in a frequency range of 70 GHz to 80 GHz.

14. A method for calibrating a multiple-input multiple-output (MIMO) radar sensor, the method comprising:

receiving a target list for the MIMO radar sensor, containing angular data and channel data for a plurality of targets in a vehicle's environment, wherein the angular data comprise information regarding a target angle at which a target is located, and the channel data comprise information regarding reflection signals received from the target in individual channels in the MIMO radar sensor;

generating model data for each of the plurality of targets, containing information regarding expected reflection signals for an assumed detection of an individual target at the target angle at a distance to the MIMO radar sensor on a basis of the angular data;

determining a model error for each of the plurality of targets, containing information regarding discrepancies between the channel data and the model data for each target;

selecting one of the plurality of targets on a basis of the determined model error, wherein the model error for the selected target is smaller than the model errors for the other targets; and determining calibration coefficients containing information regarding adjustments to channel outputs for the channels in the MIMO radar sensor on a basis of the model data and the channel data, wherein the calibration coefficients compensate for the discrepancies between the channel data and the model data.

15. The method according to claim 14, further comprising:

determining a scaling vector containing mean scaling factors for the individual channels in the MIMO radar sensor on the basis of the channel data;

determining a steering matrix on a basis of the arrangement of the channels in the MIMO radar sensor, and the angular data; and generating the model data on a basis of a multiplication of the steering matrix with the scaling vector.

16. The method according to claim 14, further comprising:

determining a mean squared error via the channels in the MIMO radar sensor.

17. The method according to claim 14, further comprising:

selecting a target on a basis of a signal-to-noise ratio for the received reflection signal, wherein a target is selected that has a signal-to-noise ratio lying above a threshold value.

18. The method according to claim 14, further comprising:

determining an angular displacement on a basis of the calibration coefficients; and calculating and using a compensation factor on the calibration coefficients, when the angular displacement lies above a threshold value, wherein the threshold value is predefined.

19. The method according to claim 18, further comprising:

executing a beam formation for a point of origin and for points in the neighborhood of the point of origin, on the basis of the calibration coefficients, wherein all of the points in the neighborhood of the point of origin are at the same angular distance to the point of origin; and calculating and using the compensation factor when the value for the response of the beam formation is greater for a point in the neighborhood of the point of origin than the value for the response of the beam formation for the point of origin.

20. The method according to claim 14, further comprising:

determining calibration coefficients for a previous time interval when it has been determined on a basis of the target list that the vehicle is not in motion.

* * * * *